United States Patent
Garin et al.

(10) Patent No.: US 8,402,770 B2
(45) Date of Patent: Mar. 26, 2013

(54) TURBINE ENGINE INCLUDING AN IMPROVED MEANS FOR ADJUSTING THE FLOW RATE OF A COOLING AIR FLOW SAMPLED AT THE OUTPUT OF A HIGH-PRESSURE COMPRESSOR USING AN ANNULAR AIR INJECTION CHANNEL

(75) Inventors: Fabrice Marcel Noel Garin, Boissise la Bertrand (FR); Maurice Guy Judet, Dammarie les Lys (FR); Patrick Claude Pasquis, Moisenay (FR); Wilfried Lionel Schweblen, Chateaubleau (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/375,915

(22) PCT Filed: Jun. 8, 2010

(86) PCT No.: PCT/EP2010/058014
§ 371 (c)(1),
(2), (4) Date: Dec. 2, 2011

(87) PCT Pub. No.: WO2010/142682
PCT Pub. Date: Dec. 16, 2010

(65) Prior Publication Data
US 2012/0085104 A1 Apr. 12, 2012

(30) Foreign Application Priority Data

Jun. 10, 2009 (FR) ...................................... 09 53829

(51) Int. Cl.
F02C 7/12 (2006.01)
(52) U.S. Cl. ....................................................... 60/806
(58) Field of Classification Search .................... 60/726, 60/751, 782, 785, 806; 415/108, 115–117, 415/173.5, 174.5; 416/95, 96 R
See application file for complete search history.

(56) References Cited

U.S. PATENT DOCUMENTS 4,425,079 A * 1/1984 Speak et al. .................. 415/139
4,674,955 A 6/1987 Howe et al.
(Continued)

FOREIGN PATENT DOCUMENTS

EP 0 188 910 A1 7/1986
EP 1 260 673 A2 11/2002
(Continued)

OTHER PUBLICATIONS

Preliminary Search Report issued Mar. 4, 2010 in France Application No. 0953829 (With English Translation of Category of Cited Documents).

(Continued)

*Primary Examiner* — Phutthiwat Wongwian
(74) *Attorney, Agent, or Firm* — Oblon, Spivak, McClelland, Maier & Neustadt, L.L.P.

(57) ABSTRACT

A turbine engine including a channel for injecting a cooling air flow of a high-pressure turbine disk, opening into a cavity that is substantially isolated, upstream, from a cavity in which an air flow sampled at the output of a high-pressure compressor circulates, by a first labyrinth seal, and downstream, from a cavity communicating with the primary flow of the turbine engine, by a second labyrinth seal. The turbine engine includes channels communicating with the injection channel and opening through a static part of the first labyrinth seal between two lips of that seal, so as to allow an air flow coming from the injection channel to be injected between the lips.

6 Claims, 4 Drawing Sheets

U.S. PATENT DOCUMENTS

| | | | | |
|---|---|---|---|---|
| 5,555,721 | A * | 9/1996 | Bourneuf et al. | 60/806 |
| 6,050,079 | A * | 4/2000 | Durgin et al. | 60/782 |
| 7,857,581 | B2 * | 12/2010 | Mons et al. | 415/173.5 |
| 8,087,249 | B2 * | 1/2012 | Ottaviano et al. | 60/726 |
| 2002/0172591 | A1 | 11/2002 | Glynn et al. | |
| 2004/0219008 | A1 | 11/2004 | Judet et al. | |
| 2008/0141678 | A1 * | 6/2008 | Brunet et al. | 60/806 |
| 2008/0141679 | A1 * | 6/2008 | Behaghel et al. | 60/806 |
| 2008/0141680 | A1 * | 6/2008 | Brunet et al. | 60/806 |
| 2009/0110561 | A1 | 4/2009 | Ramerth et al. | |
| 2011/0072832 | A1 * | 3/2011 | Blanchard et al. | 60/806 |
| 2011/0079019 | A1 * | 4/2011 | Durocher et al. | 60/796 |

FOREIGN PATENT DOCUMENTS

| | | |
|---|---|---|
| EP | 1 445 421 A1 | 8/2004 |
| EP | 2 055 895 A2 | 5/2009 |

OTHER PUBLICATIONS

International Search Report issued Aug. 16, 2010 in Application No. PCT/EP2010/058014.

* cited by examiner

TURBINE ENGINE INCLUDING AN IMPROVED MEANS FOR ADJUSTING THE FLOW RATE OF A COOLING AIR FLOW SAMPLED AT THE OUTPUT OF A HIGH-PRESSURE COMPRESSOR USING AN ANNULAR AIR INJECTION CHANNEL

TECHNICAL FIELD

The present invention relates to the field of twin-shaft turbine engines, and more particularly relates to the ventilation and cooling of components of the high-pressure compressor and the high-pressure turbine of those turbine engines.

The invention more specifically relates to the adjustment of the flow rate of a cooling air flow sampled at the output of a high-pressure compressor in turbine engines.

BACKGROUND OF THE INVENTION

Twin-shaft turbine engines comprise a high-pressure turbine arranged at the output of a combustion chamber to remove energy from a primary gas flow discharged by said combustion chamber and drive a high-pressure compressor positioned upstream of the combustion chamber and supplying said chamber with pressurized air. These turbine engines also comprise a low-pressure turbine arranged downstream of the high-pressure turbine to remove excess energy from the primary gas flow and rotate a low-pressure compressor arranged upstream of the high-pressure compressor.

The high-pressure compressor of these turbine engines can include a centrifugal downstream stage comprising an impeller.

Their high-pressure turbine generally comprises a distributor formed by a plurality of static vanes positioned at the output of the combustion chamber, and a vaned disk mounted downstream of the distributor and rotated by the flow of gases discharged by the combustion chamber.

The vaned disk of the high-pressure turbine and the impeller of the high-pressure compressor are connected to one another and are part of a high-pressure rotor of the turbine engine, so that the disk of the turbine can rotate the impeller of the compressor, in a well-known manner.

The downstream surface of the impeller of the high-pressure compressor is generally cooled by an air flow sampled at the output of said compressor, and the flow rate of which is adjusted by the play between the rotary part and the static part of a labyrinth seal, which separates a first annular cavity delimited in particular by the downstream surface of the impeller, from a second annular cavity in which a cooling air flow for cooling the vanes of the disk of the high-pressure turbine circulates as well as an air flow intended to supply a bleed cavity to limit the leakage risks at the primary flow between the distributor and the vaned disk of the high-pressure turbine.

However, in some of these turbine engines, the flow rate of the cooling air flow of the impeller can be higher than what is necessary to ensure said cooling.

This can in particular result from excessive play between the rotary portion and the static portion of the aforementioned labyrinth seal, which can in particular occur during a change in the operating rating of the turbine engine.

Part of the flow delivered by the high-pressure compressor is then pointlessly sampled on the primary flow, which considerably reduces the performance of those turbine engines.

Furthermore, the cooling air flow of the impeller is hotter, when it reaches the second annular cavity, than the cooling air flow of the vanes of the disk of the high-pressure turbine. The mixture of the two aforementioned flows therefore causes a harmful increase in the temperature of the cooling air flow of the vanes, and even more so as the flow rate of the cooling air flow of the impeller is higher.

BRIEF DESCRIPTION OF THE INVENTION

The invention in particular aims to provide a simple, economical and effective solution to these problems.

It aims in particular to reduce the flow rate of the cooling air flow of the downstream flank of the impeller of the high-pressure compressor in a turbine engine to a nominal value.

To that end, the invention proposes a twin-shaft turbine engine, comprising:

a high-pressure rotor comprising an impeller of a high-pressure compressor of the turbine engine and a vaned disk of a high-pressure turbine of the turbine engine, a combustion chamber mounted axially between the high-pressure compressor and the high-pressure turbine, two coaxial walls delimiting an annular air injection channel between them, which is connected to an annular bypass space of the combustion chamber, and which is intended to accelerate a cooling air flow for cooling the vanes of the vaned disk of the high-pressure turbine, said air flow coming from said bypass space of the combustion chamber, a first labyrinth seal comprising a static part securely connected to a first of said walls delimiting the injection channel, and a rotary part supported by a disk of the high-pressure rotor and comprising at least two annular ribs protruding toward said static part, a second labyrinth seal comprising a static part securely connected to a second of said walls delimiting the injection channel, and a rotary part securely connected to the rotary part of the first labyrinth seal, an annular flange mounted opposite the upstream flank of the vaned disk of the high-pressure turbine and delimiting, with said upstream flank, a first upstream part of a cooling circuit of the vanes of said vaned disk, a first annular cavity delimited by the downstream flank of the impeller, an inner case of the combustion chamber, said first wall delimiting the injection channel, the first labyrinth seal, and an annular wall extending axially so as to connect the impeller to said disk supporting the rotary part of the first labyrinth seal, a second annular cavity into which the injection channel opens and which is delimited by the first labyrinth seal, the second labyrinth seal, and an annular wall connecting the respective rotary parts of these labyrinth seals and in which openings are formed for putting said second cavity in communication with said cooling circuit of the vanes of the vaned disk of the high-pressure turbine, a third annular cavity that communicates with a channel for the flow of a primary gas stream of the turbine engine, and which is delimited at least by the second labyrinth seal and the annular flange, said turbine engine comprising a plurality of channels formed in said static part of the first labyrinth seal and emerging into an annular cavity delimited by two of the ribs of the rotary part of the first labyrinth seal, so as to inject air coming from the injection channel therein.

The injection of air between the rotary part and the static part of the first labyrinth seal, in the annular cavity delimited by the two aforementioned ribs, makes it possible to reduce, or even potentially cancel out, the air flow that may be circulating between the first and second annular cavities and passing between the rotary part and the static part of this first seal.

In the particular case where a cooling air flow of the downstream flank of the impeller of the high-pressure compressor, which is for example sampled at the output of said compressor, circulates in the first cavity in a direction globally oriented from upstream to downstream, and leaves this cavity through the first labyrinth seal, the invention thus makes it possible to reduce the flow rate of this cooling air flow of the impeller, and therefore the quantity of air sampled at the output of the high-pressure compressor.

This in particular makes it possible to improve the performance of the turbine engine, and to lower the temperature of the air flow circulating in the cooling circuit of the vanes and resulting from the mixture, in the second cavity, of the cooling air flow of the vanes that is relatively cold and comes from the injection channel, and the cooling air flow of the impeller, which is relatively hot and comes from the first cavity.

In a known manner, the annular injection channel preferably comprises fins inclined so as to allow a reduction of the relative tangential speed of the cooling air flow of the vanes relative to the high-pressure rotor.

Each of the aforementioned channels is advantageously connected to an inner portion of the injection channel which is situated, relative to the flow of the cooling air flow of the vanes, upstream of the respective downstream ends of said fins.

In this way, the pressure of the air admitted into the channels is higher than the pressure of the air at the output of the injection channel.

In the aforementioned particular case, the pressure of the air at the output of these channels can thus be substantially equal to, or potentially greater than that of said cooling air flow of the impeller near the upstream end of the first labyrinth seal. In general, this pressure is in fact greater than the pressure of the cooling air of the vanes at the output of the injection channel.

In general, the pressure of the air at the output of the channels depends essentially on the positioning of the connection between these channels and the injection channel, more or less upstream or downstream relative to the flow of the cooling air flow of the vanes in this injection channel.

In a known manner, each of the coaxial revolution walls delimiting the annular injection channel comprises, relative to the flow of said cooling air flow of the vanes, a substantially tapered upstream portion and a substantially radial downstream portion.

This in particular makes it possible to reduce the axial bulk of the turbine engine.

In one embodiment of the invention, the turbine engine also comprises means for putting the first annular cavity in communication with a fourth annular cavity of the turbine engine in which the hub of the vaned disk of the high-pressure turbine extends.

This makes it possible to establish a circulation of air between the first and fourth annular cavities, and thus to further reduce, or even completely cancel out, the circulation of air between the first and second cavities through the first labyrinth seal.

In the fourth annular cavity, the air coming from the first cavity can circulate in the downstream direction while ensuring ventilation of the hub of the disk of the high-pressure turbine, which extends in said fourth cavity.

This air may then potentially mix with a flow of air sampled in a stage upstream of the high-pressure compressor and intended to ventilate the hub of this disk.

In the case where the air flow circulating from the first toward the fourth cavity comes from a cooling flow of the impeller of the high-pressure compressor as described above, this air flow has the advantage that its temperature varies more quickly during variations of the operating rating of the turbine engine than that of any air flow sampled upstream in the high-pressure compressor. For this reason in particular, the ventilation of the hub of the aforementioned disk by the air flow that comes from the second annular cavity and may be mixed with the air flow sampled upstream in the high-pressure compressor makes it possible to reduce the level of the differential expansions between the rotor and the stator of the high-pressure turbine.

The aforementioned communication means preferably comprise channels formed between an upstream surface of the disk of the high-pressure rotor that supports the rotary part of the first labyrinth seal, and a downstream surface of an annular flange arranged at the downstream end of said wall connecting the impeller of the high-pressure compressor to the aforementioned disk.

These channels can for example be formed by slots formed in the downstream surface of said flange or in the upstream surface of the aforementioned disk.

BRIEF DESCRIPTION OF THE DRAWINGS

The invention will be better understood, and other details, advantages and features thereof will appear upon reading the following description provided as a non-limiting example and in reference to the appended drawings, in which.

DETAILED DESCRIPTION OF THE INVENTION

Figure 1:
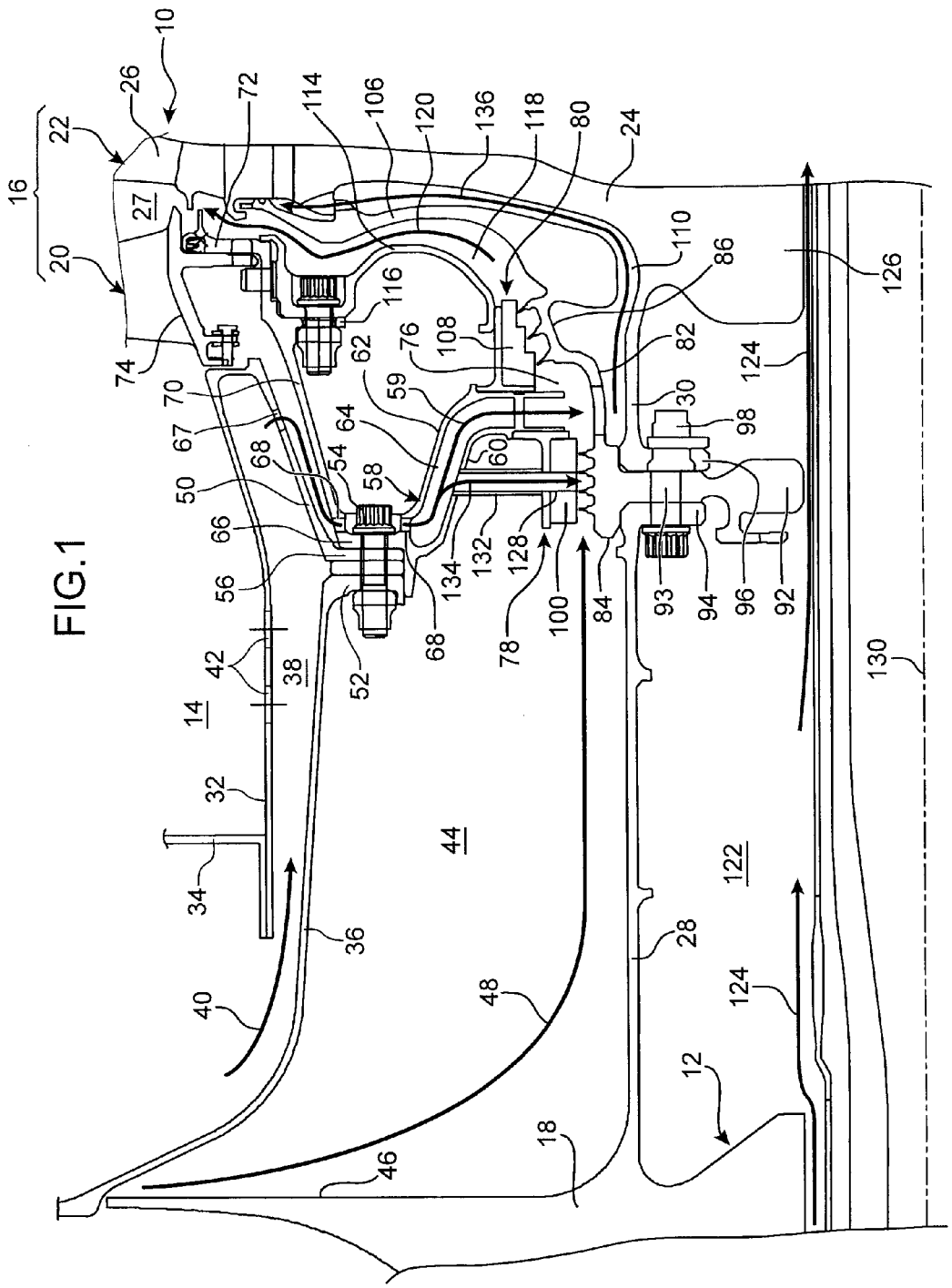
FIG. 1 is a partial view in axial cross-section of a turbine engine according to a first embodiment of the invention.
Figure 2:
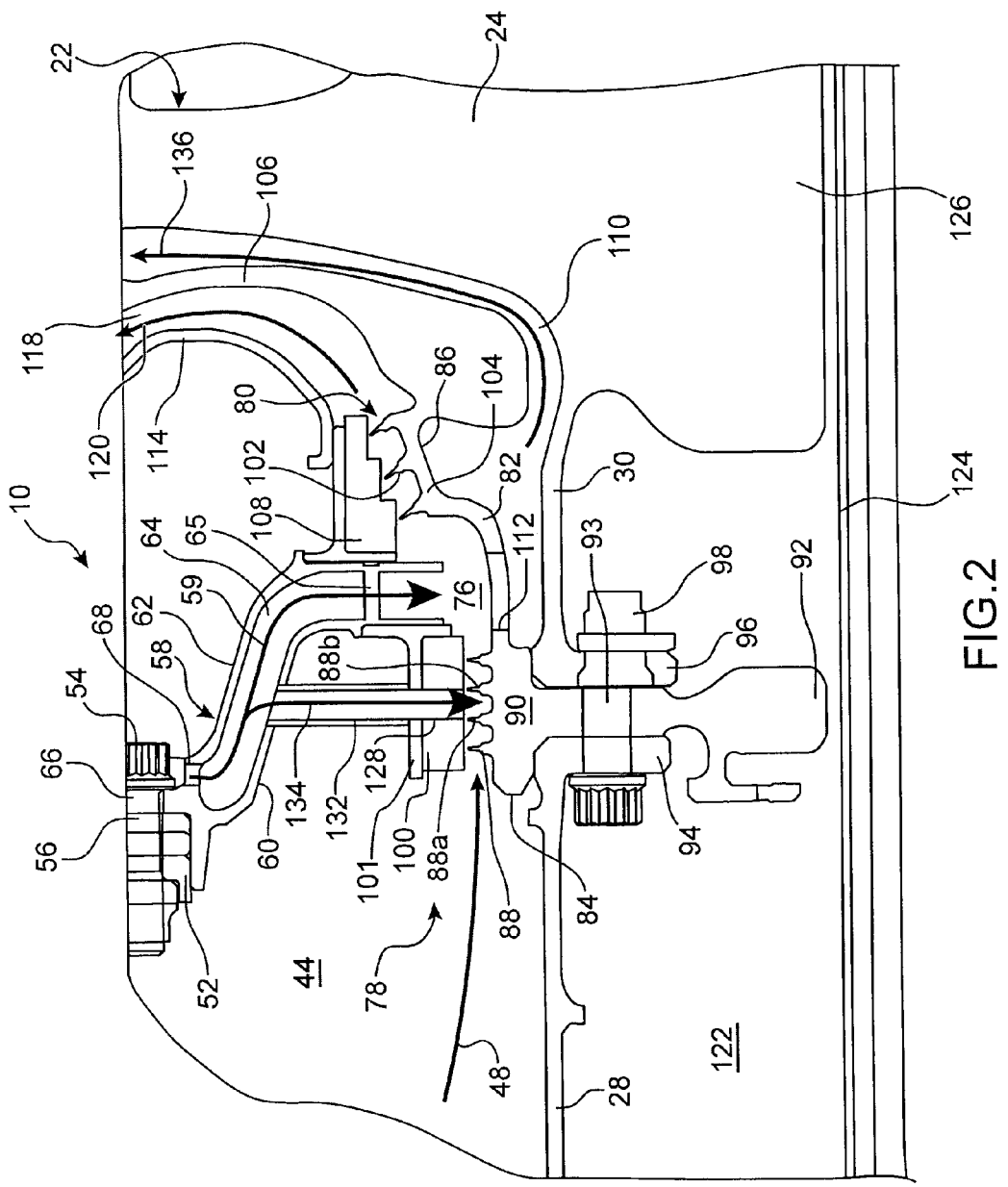
FIG. 2 is a larger-scale view of part of the turbine engine of FIG. 1.
Figure 3:
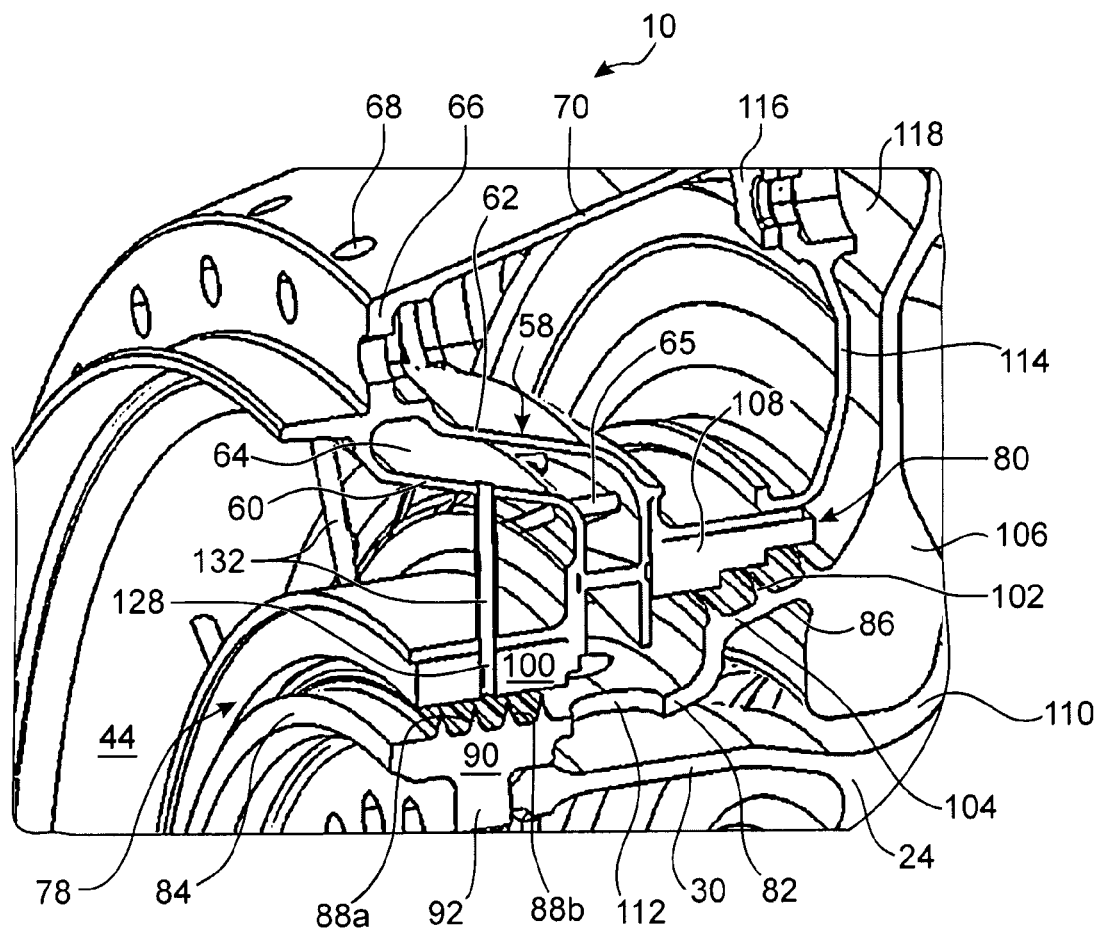
FIG. 3 is a partial perspective view of part of the turbine engine of FIG. 1, including an axial cutting plane.

FIGS. 1 to 3 show part of a turbine engine 10, such as in particular an airplane turbofan or turboprop, according to a first embodiment of the invention.

As shown in FIG. 1, the turbine engine 10 comprises, from upstream to downstream, in the flow direction of the gases inside the turbine engine, a high-pressure compressor 12, an annular combustion chamber 14, and a high-pressure turbine 16, which are partially visible in FIG. 1.

The high-pressure compressor comprises, at its downstream end, a centrifugal impeller 18 intended to supply pressurized gas to the combustion chamber 14. This compressor can also comprise other rotary members such as vaned disks (not visible in FIG. 1) arranged upstream of the impeller 18.

The high-pressure turbine comprises an upstream distributor stage 20 and a downstream rotor stage 22. The latter comprises a rotatable disk 24 supporting vanes 26 that extend in the flow 27 of the combustion gases discharged by the combustion chamber 14, which is commonly called primary flow. The vanes 26 are intended to extract mechanical energy from the aforementioned gas flow to rotate the impeller 18 and any other rotary members of the high-pressure compressor 12. To that end, the impeller 18 of this compressor and the vaned disk 24 of the turbine are connected to one another by annular shrouds 28 and 30 that project axially from the impeller 18 and the disk 24, respectively, so as to form an assembly secured in rotation commonly called high-pressure rotor of the turbine engine 10.

The combustion chamber 14 is delimited by a substantially annular inner wall 32, a substantially annular outer wall (not visible in FIG. 1), and a chamber bottom 34 (partially shown in this figure).

An internal case of the combustion chamber 14 formed by a curved annular shroud 36, which is for example connected to an annular diffuser-rectifier (not visible in FIG. 1), mounted at the output of the high-pressure compressor 12, extends radially inward relative to the inner wall 32 of the combustion chamber and delimits an annular space 38 therewith for bypassing that chamber. This annular space 38 is intended for the circulation of a flow of air 40 coming from the output of the high-pressure compressor 12, and provided on the one hand to feed the inside of the combustion chamber passing through openings 42 formed in the inner wall 32 thereof, and on the other hand to feed a cooling circuit of the rotor stage 22 of the high-pressure turbine 16, as will appear more clearly in the following.

The curved shroud 36 ensures a separation between the aforementioned bypass space 38 and a first annular cavity 44 delimited by the downstream flank 46 and the shroud 28 of the impeller 18. This first cavity 44 is intended to receive, during operation, a cooling air flow 48 for cooling the downstream flank 46 of said impeller 18, sampled at the output of the high-pressure compressor 12.

The inner wall 32 of the combustion chamber 14 is connected to the curved shroud 36 via a tapered shroud 50. To that end, the curved shroud 36 includes, at its downstream end, an annular flange 52 that is fastened, using means 54 of the screw-nut type or similar, to an annular flange 56 formed at the upstream end of the tapered shroud 50, as well as a means 58 for injecting an air flow 59 into the aforementioned cooling circuit of the rotor stage 22 of the high-pressure turbine 16, said means 58 communicating with the bypass space 38 of the combustion chamber.

The injection means 58 comprises two coaxial annular walls, inner 60 and outer 62, respectively, delimiting an annular injection channel 64. Each of these walls 60 and 62 includes a tapered upstream portion whereof the section decreases from upstream to downstream, and a downstream portion that extends radially. The injection channel 64 thus has a tapered upstream portion and a downstream portion extending substantially radially, which are separated by a bend.

In its downstream portion, the injection channel 64 comprises fins 65 (FIG. 3) which extend axially from the inner wall 60 as far as the outer wall 62 delimiting the injection channel 64, and which are tilted tangentially, from the outside in, radially, in the direction of rotation of the high-pressure rotor. These fins 65 are intended, during operation, to reduce the relative speed of the air flow leaving the channel 64 relative to the elements of the rotor, as will appear more clearly in the following.

In the embodiment shown in FIGS. 1 to 3, the walls 60 and 62 come together at their upstream end to form a radial flange 66 that is fixed on the flange 52 of the curved shroud 36 and on the flange 56 of the tapered shroud 50 by the fastening means 54.

The upstream part of the injection channel communicates with the bypass space 38 of the combustion chamber 14, for example through openings 67 formed in the tapered wall 50 and through radial passages 68 formed in the flange 66 (FIG. 1), circumferentially between the fastening means 54.

The flange 66 of the injection means 58 extends radially outward and in the downstream direction through a tapered wall 70 having, at its downstream end, a flange 72 for fastening on an annular inner structure 74 of the distributor stage 20.

The downstream part of the injection channel 64 opens into a second annular cavity 76, which is delimited upstream by a first labyrinth seal 78, and downstream by a second labyrinth seal 80, and radially inward by an annular wall 82 connecting respective rotary parts 84 and 86 of the labyrinth seals 78 and 80 between them.

In a known manner, the rotary part 84 of the first labyrinth seal 78 comprises circumferential ribs 88 (FIG. 2) commonly called "sealing elements", for example four of them, which protrude radially outward from a cylindrical wall with a circular section 90 supported by a disk 92 of the high-pressure rotor.

This disk 92 includes a middle portion 93 that is inserted between a radial flange 94 formed at the downstream end of the shroud 28 of the impeller 18 and a radial flange 96 formed at the upstream end of the shroud 30 of the disk 24, these flanges 94 and 96 being fixed to the disk 92 using means 98 of the screw-nut type or similar.

The circumferential apex of each of the ribs 88 extends opposite a cylindrical wearing part 100 with a circular transverse section and rectangular axial section, which is made from an abradable material, i.e. designed to be worn by friction against the apex of the ribs 88 before the entry into service of the turbine engine.

The cylindrical wearing part 100 is fastened on an annular wall 101, which is attached on the radially inner end of the inner wall 60 of the injection means 58, and with which said wearing part 100 forms the static part of the first labyrinth seal 78.

Similarly, the rotary part 86 of the second labyrinth seal 80 comprises circumferential ribs or sealing elements 102 (FIG. 2), for example three, which protrude radially outward from a tapered wall 104 connected by its upstream side to the rotary part 84 of the first labyrinth seal 78 via the annular wall 82, and connected downstream to an annular flange 106 (FIG. 1) that extends substantially radially, opposite the upstream flank of the disk 24 of the high-pressure turbine 16. The circumferential apex of each of the ribs 102 extends opposite a stair-shaped surface of an annular wearing part 108 (FIG. 2) made from an abradable material. This wearing part 108 is fixed to the radially inner end of the outer wall 62 of the injection means 58.

In the embodiment shown in FIGS. 1 to 3, the disk 92 supporting the rotary part 84 of the first labyrinth seal 78, the annular wall 82 connecting the respective rotary parts 84 and 86 of the labyrinth seals 78 and 80, the rotary part 86 of the second labyrinth seal, and the flange 106 are made in a single piece.

The cooling circuit of the disk 24 of the high-pressure turbine 16 comprises an annular channel 110 formed between the upstream flank of the disk 24 and the flange 106.

This channel 110 communicates on the one hand with the aforementioned second cavity 76, and therefore with the injection channel 64, via an annular row of openings 112 (FIGS. 2 and 3) formed in the wall 82 that connects the rotary parts 84 and 86 of the labyrinth seals 78 and 80. The channel 110 communicates on the other hand with the inner cooling channels (not visible in the figures) of the vanes 26 supported by the disk 24, the channel 110 thus forming an upstream part of a cooling circuit of said vanes 26.

A wall 114 (FIG. 1) extends opposite and upstream of the flange 106 and fixedly connects the wearing part 108 of the second labyrinth seal 80 to a downstream flange 116 of the tapered wall 70, so that the wall 114 makes it possible to delimit, with the flange 106 and with the second labyrinth seal 80, a third cavity 118 communicating with the primary flow 27 and sometimes called bleed cavity. This third cavity 118 is intended for the passage of a flow of air 120 with a low flow rate as far as into the primary flow 27 to limit the risk of part of the gases flowing in the primary flow 27 being introduced into the third cavity 118 while passing between the distributor stage 20 and the rotor stage 22 of the high-pressure turbine 16.

Furthermore, the annular shrouds 28 and 30 outwardly delimit a fourth annular cavity 122 intended for the circulation of a flow of air 124, which is for example sampled at an upstream stage of the high-pressure compressor 12, and which is intended to ventilate the hub 126 of the disk 24 of the high-pressure turbine.

According to the invention, a plurality of radial through channels 128 distributed circumferentially around the axis 130 of the turbine engine are formed in the wearing part 100 of the first labyrinth seal 78 and in the annular wall 101 that supports this wearing part 100. These channels 128 open at their radially inner end between two ribs 88a and 88b of the first labyrinth seal 78, and are extended at their radially outer end by corresponding radial channels 132 which connect the annular wall 101 to the inner wall 60 of the injection means 58 and which emerge in the tapered part of the injection channel 64.

As will appear more clearly in the following, the channels 128 are intended to reduce the flow rate of the air flow circulating between the first annular cavity 44 and the second annular cavity 76 through the first labyrinth seal 78.

During operation, the air flow 40 coming from the high-pressure compressor 12 and circulating in the annular passage 38 divides into a part feeding the openings 42 of the inner wall of the combustion chamber 14, and a part that forms the air flow 59 that feeds the injection channel 64 and that circulates as far as into the second cavity 76 while being accelerated by the fins 65. Due to this acceleration, the air arrives in the second cavity 76 under a considerably reduced static pressure. In the embodiment illustrated in FIGS. 1 to 3, the static pressure of the air in the second cavity 76 is for example equal to about half of the static pressure $P_0$ at the output of the high-pressure compressor 12. The static pressure of the air flow 59 is thus nearly divided by two between the input and the output of the injection channel 64.

The air flow 48 sampled at the output of the impeller 18 of the high-pressure compressor 12 circulates radially inward along the downstream flank 46 of that impeller 18 while cooling it. That flow 48 then circulates in the downstream direction and passes between the rotary part 84 and the wearing part 100 of the first labyrinth seal 78. This first seal 78 therefore regulates the flow rate of the air flow 48. In the embodiment shown in FIGS. 1 to 3, the air flow reaches the upstream input of the first labyrinth seal 78 under static pressure equal to about 0.6 $P_0$, due to the pressure losses undergone by that flow 48 in the first cavity 44.

A small fraction 134 of the air flow 59 circulating in the injection channel 64 penetrates inside the radial channels 128 and emerges between the two ribs 88a and 88b of the first labyrinth seal 78.

The position of the connection of the conduits 132 to the injection channel 64 is chosen so that the air flow 134 at the output of the channels 128 emerges between the ribs 88a and 88b under a static pressure substantially equal to or slightly greater than that of the air flow 48 at the input of the first labyrinth seal 78. This makes it possible to reduce, in the first labyrinth seal 78, the flow rate of the air flow 48 to a desired value, for example equal to 0.3% of the flow rate of the air flow delivered by the high-pressure compressor 12.

The two ribs 88a and 88b thus delimit, between the rotary part 84 and the static part 100 of the first labyrinth seal 78, an annular cavity in which the pressure of the air can be determined by the position of the connection of the conduits 132 to the injection channel 64.

In the second cavity 76, the air flow 48 mixes with the air flow 59 coming from the injection channel 64.

The majority of the resulting flow penetrates inside the annular channel 110 through openings 112 of the annular wall 82, and circulates radially outwardly along the upstream flank of the disk 24 of the high-pressure turbine, as symbolized by arrow 136, to feed the internal cooling circuit of the vanes 26 supported by the disk 24.

A small part of the air flow resulting from the mixture of the flows 48 and 59 in the second cavity passes through the second labyrinth seal 80 and thereby penetrates the third cavity 118 to form the flow 120, making it possible to limit the risks of leakage at the primary flow 27, as explained above.

In general, the channels 128 according to the invention make it possible to reduce the flow rate of the cooling air flow 48 of the downstream flank of the impeller 18 of the high-pressure compressor 12. These channels 128 typically make it possible to divide the flow rate of the flow 48 by a factor comprised between about two and three. This makes it possible to prevent the flow rate of this flow 48 from being greater than the value necessary to cool the impeller 18, which would penalize the performance of the turbine engine 10, as explained above.

Furthermore, the air flow 48 is heated during its passage along the downstream flank of the impeller 18, so that when it enters into the second annular cavity 76, said flow 48 is considerably hotter than the air flow 59 coming from the annular air injection channel 64. The reduction of the flow rate of the air flow 48 therefore makes it possible to reduce the temperature of the air feeding the second cavity 76 and thereby improve the cooling of the vanes 26 supported by the disk 24 of the high-pressure turbine 16.

In the embodiment shown in FIGS. 1 to 3, the connection of the conduits 132 to the injection channel 64 is located in the upstream tapered part of said injection channel to obtain the desired static pressure at the output of the channels 128. However, this connection can more generally be located further upstream or further downstream along the injection channel 64, provided that the static pressure of the air flow 134 at the output of the channels 128 is sufficient to allow a reduction of the air flow 48 in the first labyrinth seal 78. In practice, it is generally necessary to that end for said connection to be located upstream of the downstream end of the fins 65 that extend in the injection channel 64.

The expanse of the transverse section of the channels 128 is preferably chosen as a function of the desired flow rate for the air flow 134 at the output of these channels.

These channels 128 can also be tilted tangentially so as to reduce the relative speed of the air flow 134 at the output of the channels 128 relative to the rotary part 84 of the first labyrinth seal 78, similarly to the effect produced by the fins 65 of the injection channel 64.

Furthermore, the two ribs 88a and 88b, which delimit the cavity in which the channels 128 emerge, may not be two consecutive ribs of the rotary part 84 of the first labyrinth seal 78, and can therefore be separated by intermediate ribs 88, in particular in the event the section of the channels 128 is more extensive than the axial pitch between two consecutive ribs 88 of the rotary part 84.

Figure 4:
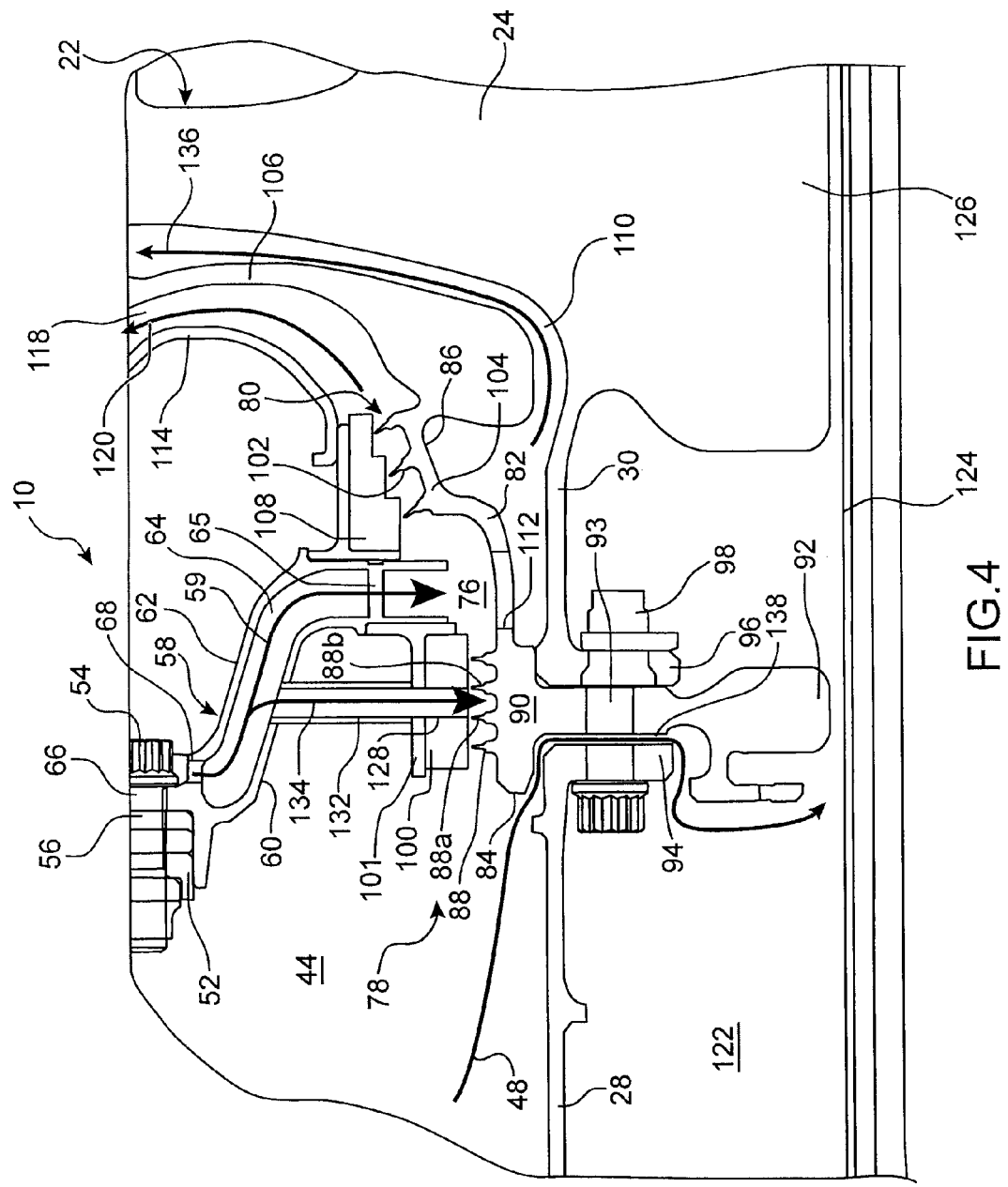
FIG. 4 is a view similar to FIG. 2, of a turbine engine according to a second embodiment of the invention.

FIG. 4 shows a second embodiment of the invention that differs from the first embodiment described above by the presence of slots 138 formed on the downstream surface of the radial flange 94, facing the upstream flank of the disk 92 of the first labyrinth seal 78, so as to form corresponding channels putting the first annular cavity 44 in communication with the fourth annular cavity 122.

In the embodiment shown in FIG. 4, these slots 138 extend radially from one end of the flange 94 to the other.

During operation, if the pressure and the flow rate of the air flow 134 at the output of the channels 128 are sufficient, the cooling air flow 48 of the impeller 18 is forced to circulate in the channels formed by the slots 138, between the flange 94 and the disk 92. The slots 138 may thus make the first labyrinth seal 78 substantially sealed from the air flow 48.

The air flow 48 then rejoins, in the fourth cavity, the air flow 124 for ventilating the hub 126 of the disk 24 of the high-pressure turbine 16.

Alternatively, the ventilation of the hub 126 of said disk 24 can be completely ensured by the air flow 48, in which case no air sampling 124 may be required upstream in the high-pressure compressor 12.

The mixture of the flows 48 and 124 or the use of the flow 48 alone for the ventilation of the hub 126 of the disk 24 can have advantages relative to the speed of the thermal variations of said flows during variations of the operating rating of the turbine engine 10. Under these conditions, in fact, it may be advantageous to cool or heat the hub of the disk 24 quickly to reduce the differential expansions between this disk and the stator elements surrounding it.

The invention claimed is:

1. A twin-shaft turbine engine, comprising:
a high-pressure rotor comprising an impeller of a high-pressure compressor of the twin-shaft turbine engine and a vaned disk of a high-pressure turbine of the turbine engine, said impeller comprising a downstream side flank on a downstream side of said impeller, and said vaned disk comprising an upstream side flank on an upstream side of said vaned disk;
a combustion chamber mounted axially between the high-pressure compressor and the high-pressure turbine;
two coaxial walls delimiting an annular air injection channel between the two coaxial walls, which is connected to an annular bypass space of the combustion chamber, and which is configured to accelerate a cooling air flow for cooling vanes of the vaned disk of the high-pressure turbine coming from the annular bypass space of the combustion chamber;
a first labyrinth seal comprising a static part securely connected to a first of the two coaxial walls delimiting the annular air injection channel, and a rotary part supported by a disk of the high-pressure rotor and the rotary part comprising at least two annular ribs protruding toward the static part;
a second labyrinth seal comprising a static part securely connected to a second of the two coaxial walls delimiting the annular air injection channel, and a rotary part securely connected to the rotary part of the first labyrinth seal;
an annular flange mounted opposite the upstream side flank of the vaned disk of the high-pressure turbine and delimiting, with the upstream side flank, a first upstream part of a cooling circuit of the vanes of the vaned disk;
a first annular cavity delimited by the downstream side flank of the impeller, an inner case of the combustion chamber, the first wall delimiting the annular air injection channel, the first labyrinth seal, and an annular wall extending axially so as to connect the impeller to the disk of the high-pressure rotor supporting the rotary part of the first labyrinth seal;
a second annular cavity into which the annular air injection channel opens and that is delimited by the first labyrinth seal, the second labyrinth seal, and an annular wall connecting the respective rotary parts of the first and second labyrinth seals, and openings are formed in the annular wall for putting the second cavity in communication with the cooling circuit of the vanes of the vaned disk of the high-pressure turbine;
a third annular cavity that communicates with a channel for the flow of a primary gas stream of the turbine engine, and the third cavity is delimited at least by the second labyrinth seal and the annular flange; and
a plurality of channels formed in the static part of the first labyrinth seal and emerging into an annular cavity delimited by two of the annular ribs of the rotary part of the first labyrinth seal, so as to inject air coming from the annular air injection channel therein.

2. The turbine engine according to claim 1, wherein the annular air injection channel comprises fins tilted so as to reduce relative tangential speed of the cooling air flow of the vanes relative to the high-pressure rotor.

3. The turbine engine according to claim 2, wherein the plurality of channels are connected to an inner portion of the annular air injection channel that is situated, relative to the flow of the cooling air flow of the vanes, upstream of the respective downstream ends of the fins.

4. The turbine engine according to claim 3, wherein each of the two coaxial walls delimiting the annular air injection channel comprises, relative to the flow of the cooling air flow of the vanes, a substantially tapered upstream portion and a substantially radial downstream portion.

5. The turbine engine according to claim 1, further comprising means for putting the first annular cavity in communication with a fourth annular cavity of the turbine engine, in which a hub of the vaned disk of the high-pressure turbine extends.

6. The turbine engine according to claim 5, wherein the communication means for putting the first annular cavity in communication with the fourth annular cavity comprises channels formed between an upstream surface of the disk of the high-pressure rotor that supports the rotary part of the first labyrinth seal, and a downstream surface of an annular flange arranged at the downstream end of the annular wall connecting the impeller of the high-pressure compressor to the disk of the high-pressure rotor.

* * * * *